United States Patent [19]

Alexandrovich et al.

[11] Patent Number: 5,082,883
[45] Date of Patent: Jan. 21, 1992

[54] REDUCED VISCOSITY POLYBLENDS OF POLYESTER AND EPOXY RESINS

[75] Inventors: Peter S. Alexandrovich, Rochester; John E. Derimiggio, Fairport; John C. Wilson, Rochester, all of N.Y.

[73] Assignee: Eastman Kodak Company, Rochester, N.Y.

[21] Appl. No.: 491,759

[22] Filed: Mar. 12, 1990

[51] Int. Cl.$^5$ ............................................. C08L 75/04
[52] U.S. Cl. .................................. 524/109; 524/114; 525/418
[58] Field of Search ................. 524/109, 114; 525/418

[56] References Cited

U.S. PATENT DOCUMENTS 4,457,998  7/1984  Gruber et al. .................... 430/98
4,693,952  9/1987  Koizumi et al. .................. 430/109

FOREIGN PATENT DOCUMENTS 0197387  10/1986  European Pat. Off. .

Primary Examiner—Maurice J. Welsh
Attorney, Agent, or Firm—Dressler, Goldsmith, Shore, Sutker & Milnamow, Ltd.

[57] ABSTRACT

Polyblends are provided which display low melt viscosities. The polyblends comprise a polyester having a $T_g$ in the range of about 50° to about 100° C. and an epoxy polymer which is either an epoxy resin or an esterified epoxy resin.

14 Claims, No Drawings

REDUCED VISCOSITY POLYBLENDS OF POLYESTER AND EPOXY RESINS

FIELD OF THE INVENTION

This invention is in the field of polyblends and toner powders made therefrom that display low melt viscosities.

BACKGROUND OF THE INVENTION

High quality electrographic process color images require smooth, high quality paper receivers such as clay coated lithographic paper stock. To fuse such process color images on clay coated papers, there is a need for toner binders that display toner melt viscosities that are substantially lower than the melt viscosities associated with typical known toner binders. Reduced viscosity needs to be achieved to obtain the desired fusing properties such as surface gloss and the elimination of light scattering voids within an image while at the same time allowing for low enough input energy or temperature such that the clay coated paper stock does not blister. Blistering is a phenomena where water within the clay coated lithographic paper stock is vaporized during the toner fusing process, causing the paper to form surface protrusions and delaminations. Thus reduced viscosity needs to be achieved to obtain good fusing quality, however, at the same time offset and jamming must be minimized. Offset is a phenomena where the toner deposit fails cohesively, during fusing, some toner stays on the paper and some sticks to the fusing roller, from which it can offset onto the next piece of paper. Resistance to offset is normally associated with high melt cohesive strength or high melt elasticity of the toner, such as is achieved by high molecular weight or crosslinked toner binder polymers. Polyester toner binders represent a useful class of materials which are capable of being tailored to offer resistance to offset. It is an object of the present invention to offer a way of substantially reducing the melt viscosity of polyester toners in order to produce high quality fused process color images at high speed on clay coated lithographic paper without blistering, while at the same time maximizing the resistance to offset. This improvement is achieved via polyblends of an amorphous polyester toner binder with a high $T_g$, very low molecular weight epoxy resin.

Polyblends of a polyester resin and an epoxy resin are taught in U.S. Pat. No. 4,693,952. The polyester resins have softening points of 110° to 150° C. and the epoxy resins have $T_m$'s between about 60° and 160° C. and $T_g$'s of at least about 55° C. The polyblends do not display a substantially reduced melt viscosity compared to the melt viscosity of polyesters used alone.

A toner composition is described in U.S. Pat. No. 4,457,998 wherein the resin particles are comprised of an uncrosslinked polymer, that can be a polyester, dispersed in a highly crosslinked polymer that can be an epoxy polymer. The polymer combination does not have a reduced melt viscosity compared to the polyester alone.

European Patent Application No. 0,197,387 discloses another toner binder composition that comprises a lactone-modified epoxy resin, a styrene-butadiene rubber and a polyester resin. The lactone modification is obtained by subjecting all or a portion of the secondary hydroxyl groups of epoxy resins having hydroxyl groups to ring opening polymerization of lactone. The styrene-butadiene rubber is used to achieve improved offset resistance; the polyester resin is used to increase toner "flexibility"; and the lactone-modified epoxy resin is used to increase toner transferability. A two component polyblend with substantially reduced melt viscosity compared to the polyester alone is not achieved.

So far as now known, no one has provided a two component polyblend of a polyester with a low molecular weight epoxy resin that has a melt viscosity that is substantially less than that of the polyester alone.

SUMMARY OF THE INVENTION

This invention relates to a class of polyblends whose members are comprised of (a) a polyester and (b) an epoxy polymer that is either an epoxy resin or an epoxy resin that has been at least partially esterified.

The polyblends are characterized by having a melt viscosity that is substantially lower than the melt viscosity of the polyester itself. Thus, the polyblends have a melt viscosity at 150° C. and a 1 rad/sec as measured on a Rheometrics Dynamic Analyzer which is not more than about 1000 poise.

Surprisingly, such a reduction in melt viscosity is achieved while maintaining a desirable offset latitude that is comparable to the offset latitude of the polyester itself. Also, a high degree of elasticity is retained by the polyblend.

When the polyblend is processed into toner powder, the fusing temperature of the toner powder is in the range of about 340° to about 380° F. which is substantially lower than the fusing temperature of toner powders made with a binder polymer comprised of the polyester used alone.

Moreover, toner powders made with the polyblends of this invention can be heat fused at speeds of about 10 ips on clay coated lithographic paper stock or the like using a heated silicone rubber coated fuser roll. Thus, these toner powders can be used for high speed, heat fusing toned process color images to produce very high quality heat fused color images on such stock. Satisfactory gloss and non-blistering of coated paper are achievable by the composition of the present invention.

Various other features, advantages, aims, purposes, embodiments, and the like of the invention will be apparent to those skilled in the art from the present specification and claims.

DETAILED DESCRIPTION

(a) Definitions

The term "particle size", as used herein, or the term "size", or "sized" as employed herein in reference to the term "particles", means volume weighted diameter as measured by conventional diameter measuring devices, such as a Coulter Multisizer, sold by Coulter, Inc.

The term "glass transition temperature" or "$T_g$" as used herein means the temperature at which a polymer changes from a glassy state to a rubbery state. This temperature ($T_g$) can be measured by differential thermal analysis as disclosed in "Techniques and Methods of Polymer Evaluation", Vol. 1, Marcel Dekker, Inc., N.Y. 1966.

The term "melting temperature" or "$T_m$" as used herein means the temperature at which a polymer changes from a crystalline state to an amorphous state. This temperature ($T_m$) can be measured by differential thermal analysis as disclosed in "Techniques and Methods of Polymer Evaluation."

The term "fusing temperature" as used herein means the temperature at which images of satisfactory quality can be produced on a fuser of a given configuration. Degree of fusing is determined by the level of gloss on a Gardiner G-20 Glossmeter. This value should be equal to or greater than 5.

The term "low molecular weight" as used herein means a number average molecular under about 5000.

The term "keep" or "keeping" as used herein in relation to a toner powder means toner that will not form a brick and remains free flowing at temperatures normally encountered in a copier or during shipping or storage.

The term "polyblend" as used herein means a mechanical mixture of two or more polymers.

The term "melt viscosity" as used herein means the complex viscosity of a polymer measured at a particular melt temperature and a particular frequency of oscillation. Melt viscosity is measured on a Rheometrics Dynamic Analyzer.

(b) Starting Materials

The polyesters of this invention are prepared by reacting the usual types of polyester monomers.

Monomers useful in preparing polyesters of this invention include any of those known to be useful in general to prepare polyester binders for toner particles. Some specific examples of such monomers are: 1,4-cyclohexanediol; 1,4-cyclohexanedimethanol; 1,4-cyclohexanediethanol; 1,4-bis(2-hydroxyethoxy)cyclohexane; 1,4-benzenedimethanol; 1,4-benzenediethanol; norbornylene glycol; decahydro-2,6-naphthalenedimethanol; bisphenol A; ethylene glycol; diethylene glycol; triethylene glycol; 1,2-propanediol; 1,3-propanediol; 1,4-butanediol; 2,3-butanediol; 1,5-pentanediol; neopentyl glycol; 1,6-hexanediol; 1,7-heptanediol; 1,8-octanediol; 1,9-nonanediol; 1,10-decanediol; 1,12-dodecanediol; pentaerythritol; 2,2,4-trimethyl-1,6-hexanediol; 4-oxa-2,6-heptanediol; succinic acid; sebacic acid; 2-methyladipic acid; diglycolic acid; thiodiglycolic acid; fumaric acid; cyclohexane-1,3-dicarboxylic acid; cyclohexane-1,4-dicarboxylic acid; cyclopentane-1,3-dicarboxylic acid; 2,5-norbornanedicarboxylic acid; phthalic acid; isophthalic acid; terephthalic acid; 2-butylisophthalic acid; 2,6-naphthalenedicarboxylic acid; 1,4-naphthalenedicarboxylic acid; 1,5-naphthalenedicarboxylic acid; 4,4'-sulfonyldibenzoic acid; 4,4'-oxydibenzoic acid; binaphthyldicarboxylic acid; 9,10-triptycenedicarboxylic acid; and the lower alkyl esters of the acids mentioned.

Polyfunctional compounds having three or more carboxyl groups, and three or more hydroxyl groups, can also be employed. Various polyols or polyacids are conventionally used to create branching in the polyester chain, such as triols, tetraols, tricarboxylic acids or functional equivalents, and the like. Examples of such branching agents include pentaerythritol, 1,3,5-trihydroxyl pentane, 1,5-dihyroxy-3-ethyl-3-(2-hydroxyethyl) pentane, trimethylolpropane, trimellitic anhydride, pyromellitic dianhydride, and the like. A presently preferred polyol is glycerol. Preferably up to about a 10/85 mole ratio of a starting monomer mixture based upon the total acid or hydroxy monomers is comprised of at least one polyol or polyacid containing three functional hydroxyl or carboxyl groups per molecule or a 10/80 mole ratio for tetrafunctional molecules.

Variations in the relative amounts of each of the respective monomer residues are possible without adversely affecting the physical properties of the polymer.

The polyesters of this invention are conveniently prepared by any of the known polycondensation techniques, e.g., solution polycondensation or catalyzed melt-phase polycondensation; for example, by the transesterification of dimethyl terephthalate, dimethylglutarate 1,2-propanediol and glycerol. The polymers can be prepared by known two-stage polyesterification procedures, such as described in U.S. Pat. No. 4,140,644 and U.S. Pat. No. 4,217,400, the latter being especially directed to the control of branching in polyesterification. The glycols and carboxylic acids (or their esterification equivalents) are heated with the branching agent, such as a triol or triacid (or their functional equivalents), and a transesterification catalyst in an inert atmosphere. Suitable temperatures are in the range of about 190° to about 280° C., and preferably about 200° to about 260° C. Thereafter, a vacuum is applied, and heating is continued, for example, at a temperature in the range of about 220° to about 240° C., to build up the molecular weight.

If desired, the degree of polyesterification can be monitored by measuring the inherent viscosity (i.v.) of samples periodically taken from the reaction.

The present invention requires low molecular weight polymers with a $T_g$ in the range of 50° to 100° C. These polymers can be obtained by:

1) purchasing commercially available polymers (e.g. EPON 1004 or 1007 which has the proper $T_g$) or by 2) purchasing commercially available polymers (e.g. EPON 836 which has a $T_g$ of 11° C.) and raising the $T_g$ by esterifying the epoxy groups with an acid such as Staybelite which is a large bulky acid).

Method 2 is preferred since the epoxy groups in method 1 could react with the fusing rollers or polyester or themself.

A third method can be used (the acetic anhydride method) to esterify all hydroxy groups which further protects the polymer from reactions with the fuser rollers, polyester or other components. This reaction causes the $T_g$ to go down.

In general, for use in toner particles, the i.v. of a polyester of this invention is chosen to be in the range of about 0.2 to about 0.80 measured in methylene chloride solution at a concentration of 0.25 grams of polymer per 100 milliliters of solution. Presently preferred polymers have a branched chain structure. Preferably the i.v. of such a polymer is in the range from about 0.30 to about 0.60.

Similarly for use in toner particles, a polyester of this invention has a fusing point in the range of about 65° to about 200° C., and a $T_g$ in the range of about 50° to about 100° C.

The number average molecular weight of the polyesters useful in the polyblends of the present invention is generally in the range of about 5000 to about 20,000.

After reaching a desired inherent viscosity and fusing point, the polyester resin is cooled and isolated. Characteristically the polyester resin is thermoplastic and amorphous.

One presently preferred subclass of polyesters of the invention comprises residues derived from the polyesterification of a polymerizable monomer composition comprising:

about 75/25 to about 100/0 mole ratio of dimethyl terephthalate based on the total diester monomers;

about 25/75 to about 0/100 mole ratio of additional diester based on the total diester monomers;

about 10/90 to about 100/0 mole ratio of 1,2-propane diol based on the total hydroxy monomers; and about 0/100 to about 90/10 mole ratio of additional glycol based on the total hydroxy monomers.

Another preferred subclass comprises residues derived from the polyesterification of the above polymerizable monomer composition which additionally contains:

about 5.0/95.0 to about 25.0/75.0 mole ratio of dimethylglutarate based on the total diester monomers; and about 1.0/98.5 to about 10.0/85.0 mole ratio of glycerol based on the total hydroxy monomers.

Toner particles can be prepared from polyesters of the present invention by any convenient procedure.

The class of low molecular weight epoxy polymers employed in the practice of this invention is comprised of epoxy resins and at least partially esterified epoxy resins. Mixtures of such resins can be used, if desired.

Such a low molecular weight epoxy resin has an epoxide equivalent weight in the range of about 188 to about 3,800, and preferably has a number epoxide equivalent weight in the range of about 230 to about 2500.

Presently preferred epoxy resins are condensates of bisphenol A with epichlorohydrin that have the general structure:

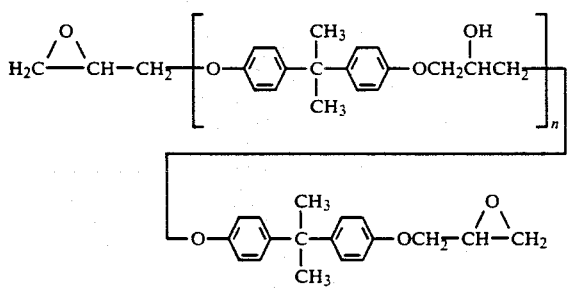

where n can have an average value in the range of about 0.15 to about 14.

As those skilled in the art will appreciate, the molecular weight of an epoxy resin affects the $T_g$, and the melt viscosity of the polyblend. The molecular weight also affects the fusion temperature of toner powders made from such a polyblend.

Aliphatic epoxy resins that have a low molecular weight and an epoxide equivalent weight in the above indicated range can be used, if desired. Such aliphatic epoxy resins characteristically have low melt viscosities and can be regarded as reactive diluents.

Epoxy novolac resins which have a low molecular weight and an epoxide equivalent weight in the above indicated range can also be used, if desired. They are prepared by reacting excess phenol or an alkyl substituted phenol, such as cresol, resorcinol, or the like, with formaldehyde under acid catalysis, and then reacting the resulting condensate with epichlorohydrin. An exemplary representative formula for such resins is:

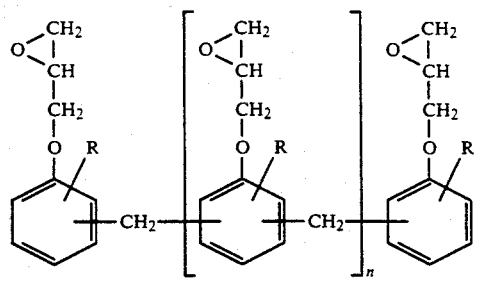

wherein:

R is a lower alkyl group or hydrogen, and n is an integer having an average value in the range of about 0.7 to about 3.4.

The term "lower" in reference to "alkyl group" means that such group contains less than 4 carbon atoms. Preferably, R is methyl (derived from o-cresol).

Multifunctional epoxy resins with such characteristics that contain at least two epoxide groups per repeating polymer unit can be used, if desired.

In general, the epoxy resins used in this invention are commercially available. Examples include Shell EPON, Alanese EPI-REZ, CIBA-Geigy Araldite, Dow D.E.R., and Reichold EPOTUF.

A presently most preferred type of epoxy resin for use in this invention is a condensate of the above indicated bisphenol A/epichlorohydrin type wherein n has an average value in the range of about 0.15 to about 14. Such preferred resins are available commercially from Shell Chemical Company under the trade designations "Epon TM Resins."

Low molecular weight epoxy resins, such as those above characterized, that are at least partially esterified with a carboxyl group of a monocarboxylic acid that contains about 2 to about 28 carbon atoms per acid molecule can be used.

Presently preferred esterified epoxy resins are substantially completely esterified; that is, both the epoxide groups and the hydroxyl groups present in an epoxy resin have been reacted with a carboxyl group.

The carboxyl group can be derived from a carboxylic acid, or acid equivalent, such as a carboxylic acid anhydride, a carboxylic acid chloride, or the like. Presently most preferred is a monocarboxylic partially hydrogenated wood rosin.

A presently most preferred type of esterified epoxy resin for use in this invention is a condensate of bisphenol A with epichlorohydrin in which only epoxide functions have been substantially completely esterified with a monocarboxylic hydrogenated rosin. Such a rosin is available commercially from Hercules Powder Company under the trade designation "Staybelite TM ".

An optional but preferred starting material for inclusion in the blend is a charge control agent. Suitable charge control agents for use in toners are disclosed, for example, in U.S. Pat. Nos. 3,893,935; 4,079,014; 4,323,634; and British Patent No. 1,501,065 and 1,420,839. Charge control agents are generally employed in small quantities, such as about 0.1 to about 3 weight percent on a total toner powder weight basis, and preferably about 0.2 to about 1.5 weight percent (same basis).

Another optional but preferred starting material for inclusion in the blend is a colorant (pigment or dye).

Suitable dyes and pigments are disclosed, for example, in Reissue U.S. Pat. No. 31,072. One particularly useful colorant for toners to be used in black-and-white electrophotographic copying machines is carbon black. When employed, colorants are generally employed in quantities in the range of about 1 to about 30 weight percent on a total toner powder weight basis, and preferably about 1 to about 8 weight percent (same basis).

Preferred starting materials are solids in a finely divided form.

(c) Polyblend Preparation

In preparing a polyblend of this invention, one first prepares a mixture of the polyester, and the epoxy polymer or an esterified epoxy polymer.

In general, the interrelationship between the components is such that, after melt blending, a polyblend results which has a melt viscosity at 150° C. and 1 rad/sec which is not more than about 5000 poise and preferably not more than about 1000 poise.

A present preference is to employ a mixture that comprises:
- about 20 to about 80 weight percent of at least one polyester; and
- about 20 to about 80 weight percent of at least one epoxy polymer; or esterified epoxy polymer.

Optionally, but preferably, the mixture also contains up to about 3 weight percent of a charge control agent and up to about 30 weight percent of a colorant.

The starting materials are preferably in the form of finely divided solid particles. Intimate uniform mixtures of starting materials are preferred for purposes of achieving a uniform polyblend. Simple mechanical blending procedures can be used.

The mixture is melt blended at a temperature in the range of about 100° to about 240° C. and preferably in the range of about 120° to about 180° C. Melt blending can be accomplished using a roll mill or an extruder. A present preference is to use a roll mill. Melt blending time (that is, the exposure period for melt blending at elevated temperature) is in the range of about 5 to about 30 minutes.

After melt blending, the resulting polyblend is cooled and can be used for toner particle manufacture.

Grinding of the heat fused polyblend can be carried out by any convenient procedure. For example, the solid blend can be crushed and then ground to a desired particle size using, for example, a fluid energy or jet mill, such as is described in U.S. Pat. No. 4,089,472. Conventional particle classification techniques can be used to achieve a toner particle composition having a desired particle size and size distribution.

(d) Polyblend

The polyblend displays a melt viscosity at 150° C. and 1 rad/sec that is in the range of about 200 poise to about 5000 poise. The polyblend also has a $T_g$ that is in the range of about 50° to about 100° C.

Toner particles prepared from the polyblend preferably have a particle size in the range of about 2 to about 25 microns and more preferably in the range of about 5 to about 15 microns. Such particles have a fusing temperature in the range of about 340° to about 380° F. on an externally heated silicone rubber fuser at 10 ips such that there is adequate gloss with $G_{20} > 5$.

The low melt viscosity of the toner powders of the present invention permits them to be used for heat fusing color toned images to clay coated lithographic paper stock or the like using a silicone rubber coated heated fuser roll operating at speeds up to about 10 ips.

The invention is illustrated by the following examples:

EXAMPLE 1

Preparation of Epoxy Esterified Epoxy Resin

An epichlorohydrin condensate with bisphenol A was obtained from Shell Chemical Company under the designation "Epon TM 836" which has a structure corresponding to Formula (1) above wherein n has an average value of about 1 and an epoxide equivalent weight of about 290 to 335. A hydrogenated rosin was obtained from Hercules Powder Company under the designation "Staybelite". The following mixture was prepared:

1) 54.88 ms (175.62 meq.) of "Epon TM 836"
2) 60.56 ms (175.62 meq.) of "Staybelite"
3) 0.12 ms of methyltriphenylphosphonium tosylate Component (3) is a charge control agent which also functions as a catalyst for the desired esterification reaction between components (1) and (2).

The mixture was heated at 220° C. under a nitrogen blanket with stirring after the mixture became molten for about 24 hours and then cooled. The product had a carboxyl content of 0.04 meq/gm and a $T_g$ of 61.8° C. A comparison of the nuclear magnetic resonance curves of each of "Epon 836", "Staybelite" and the so produced reaction product revealed the complete absence of epoxide from the reaction product.

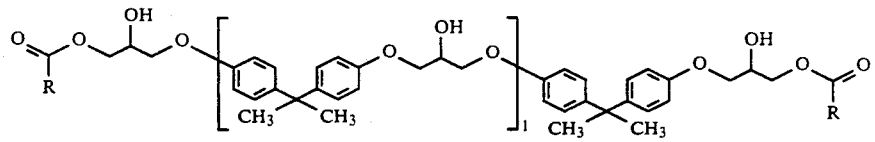

Where R = Staybelite residue

EXAMPLE 2

Preparation of Fully Esterified Epoxy Resin

A mixture of 45.0 of EPON 1002F with epoxy functions previously esterified with Staybelite by the method of Example and 45.0 of acetic anhydride as stirred and heated at reflux for 1.5 hours. Excess acetic anhydride and acetic acid were distilled from the reaction mixture in a 220° C. bath at atmospheric pressure and finally with vacuum.

$T_g = 51.7°$ C.

$CO_2H = 0.030$ meq/g

The structure was confirmed by nmr and IR.

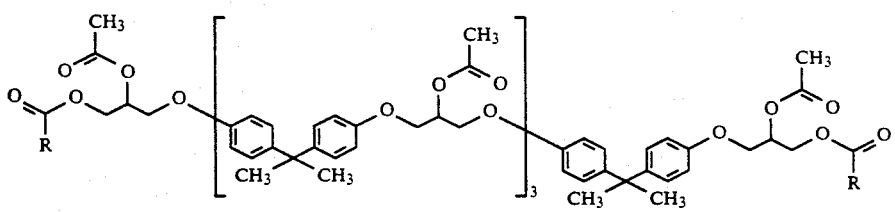

where R = Staybelite residue

EXAMPLE 3

Preparation of Fully Esterified Epoxy Resin

A mixture of 50.0 g of EPON 1009, 50.0 g of acetic anhydride and 0.05 g of methyltriphenylphospohium tosylate was heated at reflux for four hours. Excess acetic anhydride and acetic acid were removed by distillation in a 220° C. bath at atmospheric pressure and finally with vacuum.

$T_g = 58.3°$ C.
$CO_2H = 0.014$ meq/g

The structure was confirmed by nmr and IR (epoxy and hydroxyl functions were absent).

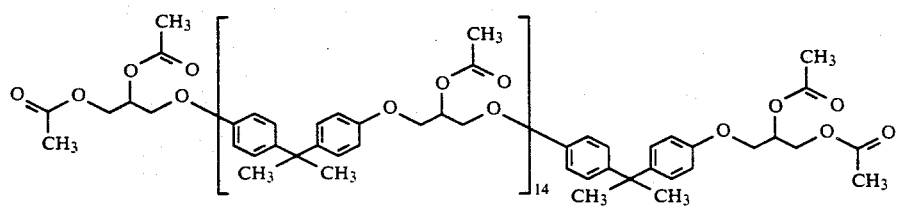

In Example 1 only the epoxy groups have been reacted with Staybelite.

In Example 2 the epoxy end groups were first reacted with Staybelite. Then the hydroxy groups were reacted with acetic anhydride.

In Example 3 both the epoxy groups and the hydroxy groups have been reacted with acetic anhydride.

EXAMPLE 4

Preparation of Esterified Epoxy Resin

A reaction product of epichlorohydrin with a novolac resin made with cresol and formaldehyde was obtained from Ciba Giegy under the designation "ECN 1235". This epoxy novolac resin had a number average molecular weight of about 540 and an epoxide equivalent weight of about 200.

Using this resin and the "Staybelite" material described in Example 1, the following mixture was prepared:
 a) 40.0 g (116.0 meq) of Staybelite
 b) 23.2 g (116.0 meq) of ECN 1235

This mixture was heated in a 165° C. bath under $N_2$ to give a stirrable melt when there was admixed 0.07 g of methyltriphenylphosphonium tosylate. The resulting mixture was stirred for 30 minutes, then at 220° C. under nitrogen for approximately 1.5 hrs. and cooled.
 Analysis:
$T_g = 66.5°$ C.
$CO_2H = 0.01$ meq/g

EXAMPLE 5

Preparation of Polymers

A mixture of
 330.1 g (1.70 mol) of dimethylterephthalate; 48.1 g (0.30 mol) of dimethylglutarate; 201.7 g (2.65 mol) of 1,2-propanediol; 9.21 (0.10 mol) of glycerol and catalytic amounts of zinc acetate dihydrate and antimony (III) oxide was heated in a 1 liter polymer flask equipped with a Vigreax-Claisen head, nitrogen inlet and sealed side arm according to the following schedule:
 2 hrs at 220° C.;
 1 hr at 240° C.; and
 1 hr at 240° C. with head removed A metal blade stirrer was then introduced and the mixture was stirred at 240° C. for 1.5 hrs at 0.30 mm pressure. The polymer which resulted was then cooled and isolated.

IV(DCM) = 0.41
$T_g = 60°$ C.

EXAMPLE 6

Preparation of Polyblends

A. A polyblend of a polyester polymer as in Example 5 and an epoxy resin with epoxy groups esterified by a monocarboxylic acid where the epoxy material is EPON 836 (Shell Chemical Co.) and the carboxylic acid is Staybelite (Hercules Co.) as in Example 1 was prepared by a conventional melt blending technique. Onto a 2 roll mill with a roll temperature of 120° C. was added 20 g of the polyester, 20 g of the esterified epoxy resin, 2.4 g of a copper phthalocyanine pigment, and 0.4 g of a charge agent, N,N-dimethyl-N-stearyl-N-benzylammonium meta-nitrobenzenesulfonate. The mixture was blended on the roll mill for 20 minutes then allowed to cool.

B. A polyblend of a polyester polymer as in Example 5 and an epoxy resin, EPON 1004F from Shell Chemical Company, was prepared as in Example 6A. To a two roll mill at 120° C. was added 20 g of the polyester, 20 g of the epoxy resin, 2.4 g of 1 copper phthalocyanine pigment, and 0.4 g of the charge agent N,N-dimethyl-N-stearyl-N-benzylammonium meta-nitrobenzenesulfonate. The mixture was blended on the roll mill for 20 minutes then allowed to cool.

EXAMPLE 7

Preparation of Toner Powders

A. The polyblend of Example 6A was coarse ground on a Wiley mill with a 2 mm screen. The coarse ground powder was then jet milled to toner particle size on a Trost model TX mill at a pressure of 70 psi and 1 g/min feed rate. The resulting particle size was 4.2 number median diameter and 6.4 volume median diameter as determined on a Coulter Counter.

B. The polyblend of Example 6B was coarse ground and jet milled as in Example 7A to a toner powder. The resulting particle size was 4.9 number median diameter and 8.90 volume median diameter as determined on a Coulter Counter.

EXAMPLE 8

Toner Powder Use Characteristics

The toner powder of example 7A, based on the polyblend of example 6A, which itself was prepared from the epoxy esterified epoxy resin of Example 1 and the polyester resin of Example 5, was subject to a series of tests of fusing performance. Patches of about an area of 1"×2" were prepared by electrographic development, using a clay coated 80 lb lithographic paper stock. The toned samples were passed through a fuser assembly comprising a heated soft silicone rubber coated fuser roll and a hard fluoropolymer coated backup roll at speeds of either 10 or 20 inches per sec. The surface temperature of the fuser was varied from 340° F. to 410° F. At 410° F. the clay coated paper stock blistered. A G20 gloss value of 5 is considered the minimum acceptable. The Example 7A toner powder achieved the minimum acceptable gloss of 5 at 360° F., up to G20=20 at 405° F. There were no offset failures. The toner powder of Example 7B achieved similar gloss values as those of Example 7A, at temperatures of about 30° F. higher. A toner powder based on the polyester resin of Example 5 alone was not able to reach a G20 glass value of 5 at any temperature below the 410° F. blistering threshold. Polyblend toner 5A thus shows useful fusing in the desired range less than 380° F.

EXAMPLE 9

Improved Rheological Properties of the Polyblends

The toner materials property most useful in describing fusing performance is melt viscosity. In order to achieve high image quality the toner surface must become glossy, and toner must flow together to eliminate air interfaces and light scatter. This requires as low a melt viscosity as possible. High speed fusing also requires low melt viscosity as does fusing on clay coated paper without blistering. However, low melt viscosity can lead to toner offset onto fuser rolls and wraps and jams in the fuser. Higher melt elasticity in dynamic rheological measurements can be quantified by a value known as the loss tangent, or tan $\delta$, which is the ratio of the viscous modulus to the elastic modulus. Thus the lower is tan $\delta$, the higher the melt elasticity. Thus the desired rheological property of the toner is to have a low melt viscosity while at the same time having low tan $\delta$ (or high melt elasticity). Table I describes rheological data on resins and polyblends obtained on a Rheometrics Dynamic Analyzer at 150° C. at a frequency of 1 rad/sec.

The values given are the complex viscosity or melt viscosity in poise, and loss tangent of tan $\delta$.

TABLE I

| | MELT RHEOLOGY 150° C., 1 rad/sec | |
|---|---|---|
| Sample | Melt Viscosity $\eta$ (poise) | Loss Tangent Tan $\delta$ |
| Polyester, as in Example 5 | 10300. | 7.2 |
| Polyblend, as in Example 6A | 781. | 1 0.1 |
| Polyblend, as in Example 6B | 1500. | 11.3 |
| Epoxy esterified epoxy resin, as in Example 1 | 26.2 | 104. |
| Epoxy resin, EPON 1004F Shell Chemical Co. | 54.8 | 32.6 |
| Styrene-acrylic toner resin, Piccotoner 1221, Hercules Co. | 2180. | 48.4 |

The polyblends are seen to greatly lower melt viscosity, while at the same time suffering only a small increase in tan $\delta$ compared to the polyester resin itself. Included are data for the epoxy materials; these are of very low viscosity but very high tan $\delta$. For comparison, a styrene-acrylic toner resin typical of the industry is shown; the polyblends of this invention are considerably lower in viscosity but higher in elasticity than this material.

The foregoing specification is intended as illustrative and is not to be taken as limited. Still other variations within the spirit and the scope of the invention are possible and will readily present themselves to those skilled in the art.

We claim:

1. A polyblend for a toner powder comprising:
   (a) a polyester that is the reaction product of at least one carboxylic acid monomer and at least one alcohol wherein most of the alcohol and the carboxylic acid monomers have a functionality of less than three, the polyester having a glass transition temperature in the range of about 50° to about 100° C., and a number average molecular weight in the range of about 5000 to 20,000;
   (b) a low molecular weight epoxy polymer selected from the group consisting of:
      (1) epoxy resins having an epoxide equivalent weight in the range of about 188 to about 3800; and
      (2) epoxy resins having such epoxides which are additionally at least partially esterified by at least one monocarboyxlic acid; and mixtures thereof.

2. The polyblend of claim 1 wherein: said epoxy polymer is an epoxy resin that is a condensate of epichlorohydrin and bisphenol A having the formula:

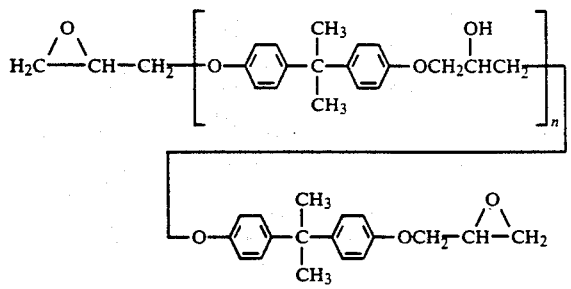

wherein n has an average value in the range of about 0.15 to about 14.

3. The polyblend of claim 2 wherein, in said epoxy resin, n has an average value in the range of about 0.4 to about 6, and said polyblend has a glass transition temperature in the range of about 50° to about 70° C.

4. The polyblend of claim 3 wherein n has an average value of about 0.4.

5. The polyblend of claim 4 wherein, in said esterified epoxy resin, n has an average value in the range of about 0.4 to about 4, said monocarboxylic acid is a hydrogenated rosin and said polyblend has a glass transition temperature in the range of about 50° to about 70° C.

6. The polyblend of claim 1 wherein the polyester contains a branching agent.

7. The polyblend of claim 1 which additionally contains about 1 to about 30 weight percent of a dispersed colorant on a 100 weight percent total polyblend basis.

8. The polyblend of claim 1 which additionally contains about 0.1 to about 3 weight percent of a dispersed charge control agent.

9. The polyblend of claim 1 wherein said polyester is derived from the polyesterification of a polymerizable monomer composition comprising:
about 75/25 to about 100/0 mole ratio of dimethyl terephthalate based on the total diester monomers;
about 25/75 to about 0/100 mole ratio of additional diester based on total diester monomers;
about 10.0/90.0 to about 100.0/0.0 mole ratio of 1,2-propane diol based on the total hydroxy monomers; and
about 0.0/100.0 to about 90.0/10.0 mole ratio of additional glycol based on the total hydroxy monomers.

10. The polyblend of claim 1 wherein said polyester additionally comprises:
about 5/95 to about 25/75 mole ratio of dimethylglutarate based on the total diester monomers; and
about 1.0/98.5 to about 10.0/85.0 mole ratio of glycerol based on the total hydroxy monomers.

11. A process for preparing a polyblend having a low melt viscosity comprising the steps of
(a) admixing together on a 100 weight percent total mixture basis:
about 10 to about 90 weight percent of a polyester that is the reaction product of at least one carboxylic acid monomer and at least one alcohol wherein most of the alcohol and the carboxylic acid monomers have a functionality of less than three, the polyester having a glass transition temperature in the range of about 50° to about 100° C., and a number average molecular weight in the range of about 5000 to 20,000;
about 10 to about 90 weight percent of a low molecular weight epoxy polymer selected from the group consisting of:
epoxy resins having an epoxide equivalent weight in the range of about 188 to about 3800, and epoxy resins having such an epoxide equivalent which are at least partially esterified by at least one monocarboxylic acid and mixtures thereof; and
(b) melt blending such mixtures at a temperature in the range of 100° to about 240° C.

12. The process of claim 11 wherein said epoxy polymer is an epoxy resin.

13. The process of claim 11 wherein said epoxy polymer is an epoxy resin in which the epoxy functions have been substantially completely esterified by a monocarboxylic acid.

14. The process of claim 13 wherein said monocarboxylic acid is a partially hydrogenated rosin.

* * * * *

UNITED STATES PATENT AND TRADEMARK OFFICE
CERTIFICATE OF CORRECTION

PATENT NO.   :   5,082,883
DATED        :   January 21, 1992
INVENTOR(S)  :   Alexandrovich et al.

It is certified that error appears in the above-identified patent and that said Letters Patent is hereby corrected as shown below:

Column 3, line 60   "dihyroxy" should be --dihydroxy--.
Column 8, line 29   "ms" should be --gms--. (Patent Office error)
Column 8, line 30   "ms" should be --gms--. (Patent Office error)
Column 8, line 31   "ms" should be --gms--. (Patent Office error)
Column 8, line 59   "45.0" should be --45.0g--. (Patent Office Column 8, line 61   "45.0" should be --45.0g--. (Patent Office Column 8, line 61   "anydride as" should be --anhydride was--.

Signed and Sealed this

Twenty-fifth Day of May, 1993

Attest:

MICHAEL K. KIRK

Attesting Officer         Acting Commissioner of Patents and Trademarks